July 2, 1963 — A. W. ENSLEIN — 3,095,751
HIGH RATIO DOUBLE ACTION STEPPER UNIT
Filed Aug. 5, 1960 — 2 Sheets-Sheet 1
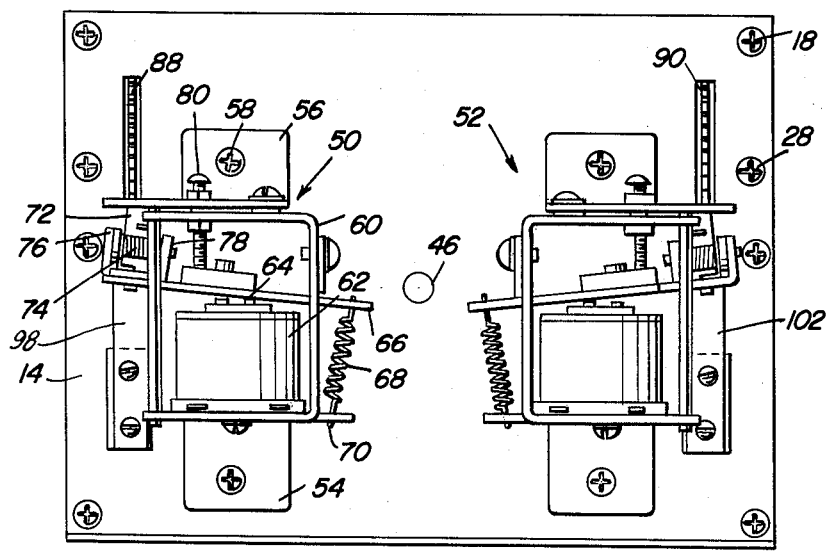
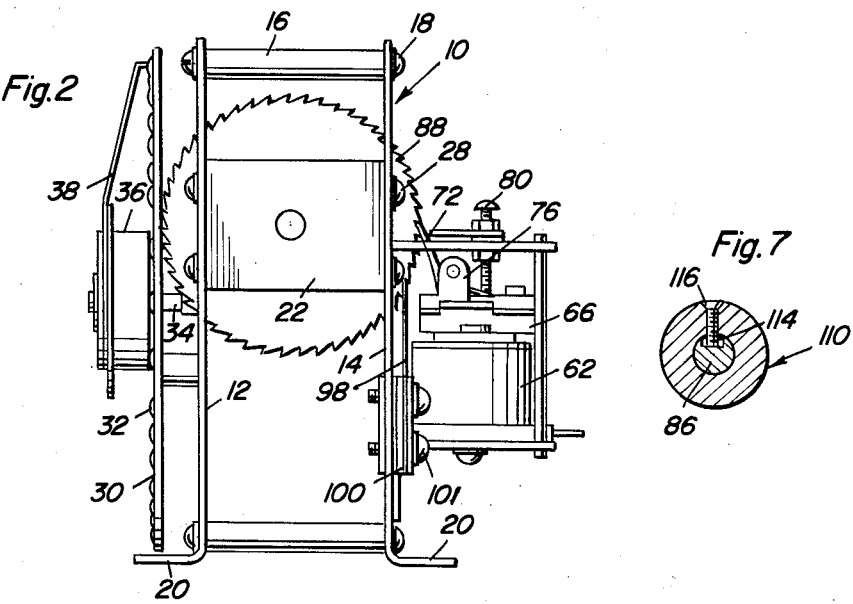
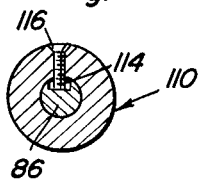
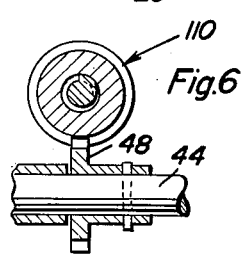
Arthur W. Enslein
INVENTOR.

July 2, 1963  A. W. ENSLEIN  3,095,751
HIGH RATIO DOUBLE ACTION STEPPER UNIT
Filed Aug. 5, 1960  2 Sheets-Sheet 2

Arthur W. Enslein
INVENTOR.

BY Clarence A. O'Brien
and Harvey B. Jackson
Attorneys

United States Patent Office 3,095,751
Patented July 2, 1963

3,095,751
HIGH RATIO DOUBLE ACTION STEPPER UNIT
Arthur W. Enslein, 3815 Trevor Ave., Cheviot, Cincinnati, Ohio; George W. Rapp, administrator of said Arthur W. Enslein, deceased
Filed Aug. 5, 1960, Ser. No. 47,630
5 Claims. (Cl. 74—142)

This invention relates to a high ratio double action stepper unit designed for use in pin ball type amusement machines, and other applications where high ratio electrical impulse counting or scoring is required.

Amusement devices of the pin ball type generally include a complex of units which operate in sequence for adding or subtracting high digital totals. Because a multitude of separate units acting in sequence is necessary, the housing of the amusement machine is often bulky and heavy. Moreover, inasmuch as the conventional type machines employ several individual units operating in sequence, each performing an identical function, care must be taken to maintain the machine in proper operating condition because, of course, a malfunctioning of any one of the multiple units will cause a malfunctioning of the entire machine.

In the light of the above, it is the principal object of this invention to provide a single device constituting the invention which is adapted to be employed in pin ball type amusement machines and other similar applications. The device herein may be substituted for the multiple units generally employed for the purpose of effecting high digital totals by addition or subtraction, generated by electrical impulses.

It is a still more particular object of this invention to provide a stepper unit which may be stepped in opposite directions and by different amounts in accordance with different input pulses. The unit includes a wiper assembly which is driven over a contact plate. Two relay assemblies are employed for selectively moving a rack gear tooth spool which in turn rotates a wiper drive gear connected to the wiper assembly. Energization of either of the relay assemblies moves the gear tooth spool in a selective direction an incremental amount for effecting an incremental movement of the wiper drive gear.

It is a more particular object of this invention to provide a stepper unit including a wiper assembly driven over a contact plate by impulses received by relay assemblies. A pair of relay assemblies are provided for driving the wiper assembly in either of two selective directions.

The means connecting the relay assemblies to the wiper assembly permit an unusually high reduction drive ratio to be achieved between the rate of relay impulse displacement and wiper assembly movement so as to insure precise positioning thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear elevational view of the stepper unit showing particularly the relay assemblies employed therewith;

FIGURE 2 is an end elevational view of the stepper unit particularly showing the cooperation between one of said relay assemblies and a ratchet drive wheel;

FIGURE 6 is a sectional view taken substantially along the plane 6—6 of FIGURE 5; and FIGURE 7 is a sectional view taken substantially along the plane 7—7 of FIGURE 5.

Figure 3:
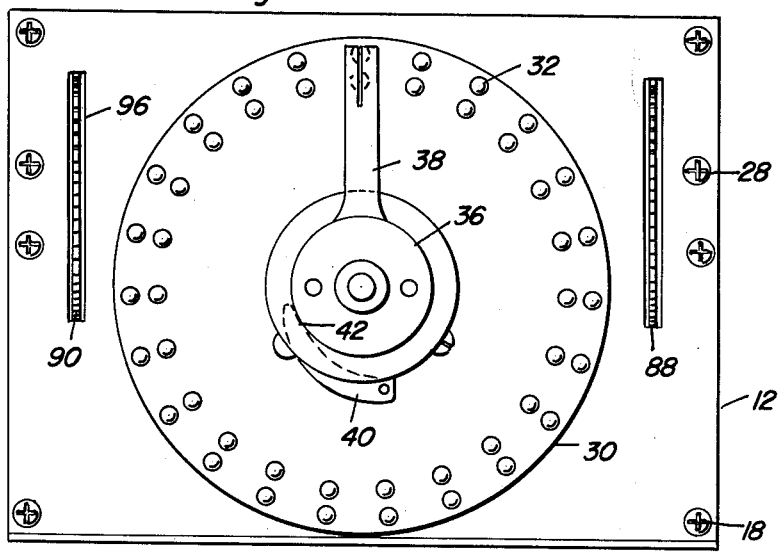
FIGURE 3 is a front elevational view of the unit particularly illustrating the contact plate and wiper drive assembly.
Figure 4:
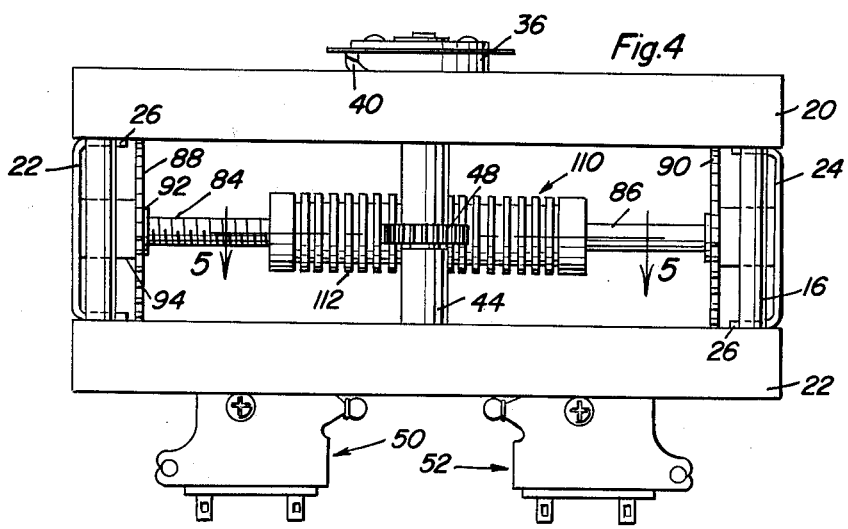
FIGURE 4 is a bottom plan view of the unit.

With continuing reference to the drawings, it will be noted that a support assembly 10 is provided including a pair of spaced plates 12 and 14. The plates 12 and 14 are spaced from each other by a plurality of spacer bars 16 fitted between the plates at several points. The bars 16 are held to the plates by bolts 18 which may be threaded into the bar. The plates 12 and 14 are flanged at their lower edge 20. Also supported between the spaced plates 12 and 14 are a pair of U-shaped members 22 and 24. Each of the members 22 and 24 includes a pair of legs 26 and the legs are fastened to the plates 12 and 14 by appropriate screw fasteners or such 28. The members 22 and 24 serve as bearing surfaces as will be better appreciated later.

Secured to plate 12 is a contact plate 30 having several spaced contacts 32 formed around the outer edge thereof. The contact plate 30 is formed of insulative board material and the contacts 32 are fixed therein and adapted to be connected to appropriate scoring portions of the amusement device in which the stepper unit is to be employed. Extending through the center of the contact plate 30 is a wiper assembly drive spindle 34 to which hub 36 is fixed. Hub 36 carries wiper arm 38 thereon with the wiper arm 38 projecting into contact with the contacts 32 carried along the outer edge of the contact plate 30. A brush 40 is secured to the contact plate 30 and is bent around into engagement with the hub 36 at 42. The brush 40 is also provided with a terminal beneath the contact plate 30. It will be appreciated that the wiper arm 38 is moved around the contact plate 30 as the spindle 34 drives the hub 36 and selective connections will be formed between the terminal connected to brush 40 and through the hub 36 and arm 38 to the terminals of contacts 32 engaged with the arm 38.

The drive spindle 34 constitutes a reduced end of a wiper drive shaft 44 which is journaled for rotational movement betwen the plates 12 and 14 with its reduced ends fitting through central openings 46 in the plates with the plates serving as bearing surfaces. A wiper drive gear 48 is fixed to the wiper drive shaft 44. It is desired to rotate the wiper drive shaft 44 incrementally in either direction. The rotation of the drive shaft 44 is to be in response to the selective actuation, caused by electrical impulses, of the relay assemblies 50 and 52.

The relay incremental drive assemblies are identical in construction and accordingly particular reference will be confined to assembly 50. A pair of brackets 54 and 56 are fastened to each end of the plate 14 by screw fasteners 58. The bracket portions 54 and 56 are formed integrally with a U-shaped frame 60. Supported by the frame 60 is a relay coil 62. The relay coil 62 is provided with a pole face 64. Armature 66 is disposed immediately above the pole face 64 for movement thereby. The armature 66 constitutes a substantially flat plate which is fitted through a slot in the frame 60 and which terminally receives a spring 68. The spring 68 is anchored to the frame 60 at a second terminal 70. It will be appreciated that upon energization of the relay coil 62, the armature 66 will be drawn to the pole face 64 pivoting the armature in the slot provided in the frame 60 against the spring urging of spring 68. Terminally carried by the armature 66 is a pawl 72 which is spring urged outwardly by coil spring 74 fitted between legs 76 and 78 of the pawl frame. A limit screw 80 is threaded in the frame 60 and may be adjusted so as to limit the movement of the armature 66.

As previously noted, members 22 and 24 are secured between plates 12 and 14. A threaded spool drive shaft 84 is journaled in the opening defined in member 22 while a slotted spool drive shaft 86 is journaled in an opening defined in member 24. Secured to each of the spool drive shafts 84 and 86 respectively are ratchet drive wheels 88 and 90. The drive wheels 88 and 90 are secured to reduced portions 92 of collars 94 which are fixed to the shaft by means of setscrews or such. The ratchet drive wheels 88 and 90 extend through aligned slots 96 formed in the plates 12 and 14.

The pawl 72 of each of the relay assemblies 50 and 52 is respectively engaged with the circumferential teeth on the ratchet wheels 88 and 90. A leaf spring 98 is supported between spacer blocks 100 by screw fasteners 101 adjacent the ratchet drive wheel 88. A similar spring 102 is supported in like manner adjacent the ratchet drive wheel 90. The leaf springs 98 and 102 engage the circumferential teeth of the drive wheels 88 and 90 to prevent free rotation thereof. The ratchet drive wheels 88 and 90 are of course, however, permitted to rotate in one direction with respect to the springs 98 and 102. For example, noting FIGURE 2, it will be appreciated that the ratchet drive wheel 88 may move in a counterclockwise direction, the spring 98 preventing a clockwise movement only. The pawl 72 of the relay assemblies 50 and 52 are engaged with the circumferential teeth of the wheels 88 and 90 and it will be noted that upon energization of the left relay coil 62 as viewed in FIGURE 1, the armature 66 will be drawn downwardly against the urging of spring 68 to move the pawl 72 in a discrete number of teeth along the circumference of the ratchet drive wheel. It will be appreciated that the number of teeth which the pawl 72 is moved along the ratchet drive wheel is determined by the screw 80. After energization, the coil 62 is deenergized and the spring 68 returns the armature 66 to their position shown in FIGURE 1 with a resulting movement of the ratchet drive wheels 88 and 90.

Figure 5:
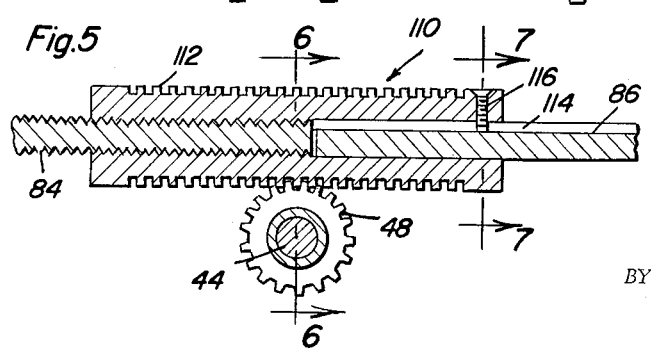
FIGURE 5 is an enlarged sectional view taken substantially along the plane 5—5 of FIGURE 4.

A gear tooth spool 110 is provided with the spool 110 including an external rack gear 112 engaged with the wiper drive gear 48. Particular attention is called to FIGURE 5 wherein a screw drive engagement between the rack gear 112 and wiper drive gear 48 is shown. The spool 110 is internally threaded on one end thereof and the threaded spool drive shaft 84 is threadedly engaged therein. The slotted spool drive shaft 86 is provided with a longitudinal slot 114. The slotted spool drive shaft 86 also extends into the spool 110. A setscrew 116 extends through the spool 110 and into the slot 114 of the slotted spool drive shaft 86 so as to rotatively couple the shaft 86 to the spool 110 yet accommodate relative axial movement.

It is felt that the operation of the invention should at this stage be understood. By selectively pulsing one of the relay coils of the relay assemblies 50 or 52, the wiper arm 32 may be driven incrementally at different speeds in different increments about the plate 30. Assume that the coil 62 of the assembly 50 is pulsed rapidly several times. The pawl 72 of the assembly 50 will in turn of course move the ratchet drive wheel 88 corresponding to the number of pulses and the setting of the screw 80. That is, if the screw 80 is set so that one impulse of the relay 62 will cause the pawl 72 to jump only one tooth on the circumference of the ratchet drive wheel 88, five pulses on the coil 62 will result in a rotational movement of the ratchet drive wheel 88 corresponding to five teeth. It will be seen therefore that inasmuch as very many circumferential teeth are provided on the ratchet drive wheel 88, a great many impulses must be impressed on coil 62 to rotate the drive wheel 88 one complete turn. The drive wheel 88 is secured to the threaded spool drive shaft 84. Rotation of the threaded spool drive shaft 84 of course causes the longitudinal movement of the gear tooth spool 110 at a high reduction ratio through the screw drive connection inasmuch as it is prevented from rotational movement due to the engagement between the set screw 116 and slot 114 in the slotted spool drive shaft 86. It should further be appreciated that energization of the coil of relay assembly 52 will cause a longitudinal movement of spool 110 in a direction opposite to that caused when the coil of assembly 50 is energized by rotation of the spool 110 on the stationary screw shaft 86 with which it is threadedly engaged.

From the foregoing, it should be appreciated that the device herein embodies a new, unique and simplified means of driving a wiper assembly either forward or backward across a contact plate only to positions wherein the wiper makes electrical connections with contacts located on the face of the contact plate. The contact plate may be appropriately wired into a circuit to indicate scores, or to perform other functions as required. In any event, it will be appreciated that an extremely high reduction ratio between the input electrical pulses and the wiper assembly movement is achieved with an extremely simple, compact, and reliable structure. It is to be noted that the ratio of forward to backward movement of the wiper assembly may be varied by introducing relay driven ratchet drive wheels whose number of circumferential teeth are not equal. For example, one ratchet drive wheel may be formed with 50 circumferential teeth while the other is formed with 100. This arrangement would provide a unit which would be inclined to step a greater distance in one direction than the other. It will also be noted that since shafts 84 and 86 are rotated in the same direction, simultaneous rotation by simultaneous driving pulses will be operative to lock the spool 110 to the shafts against any relative axial movement so as to be ineffective to displace the drive gear 48 meshing therewith. Accordingly, only one driving pulse at a time will be operative to move the wiper as hereinbefore indicated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A high reduction ratio drive mechanism adapted to convert a plurality of intermittent driving pulses from independent sources into movement of a single control member by different incremental amounts and different directions for digital summation of values corresponding to said driving pulses from the respective independent sources, comprising, a plurality of incremental drive assemblies each selectively adjusted for displacement by a preset amount in response to a driving pulse from an associated source, positive drive means operatively connected to each of said incremental drive assemblies for movement thereof at a fixed speed ratio and in a selected direction by different amounts, and means drivingly connecting said drive means to the control member for movement thereof in one of said selected directions and by one of said different amounts dependent upon the source from which the driving pulse is derived.

2. The combination of claim 1, wherein said drive means comprises, rack means, screw means drivingly connecting said rack means to at least one of said incremental drive assemblies for longitudinal displacement of the rack means in one direction, and slide means operatively connecting another of said incremental drive assemblies to the rack means for rotation thereof to longitudinally displace the rack means in the other direction so as to prevent simultaneous displacement of the rack means by more than one driving pulse at a time.

3. In combination with a control switch assembly having a fixed plate with a plurality of circumferentially spaced locations thereon and a driven element rotatably mounted for discrete movement between said locations, and a drive mechanism for displacing said driven element by different incremental amounts in different directions for movement between said locations on said plate in response to driving pulses from a plurality of independent sources, said drive mechanism comprising, a plurality of incremental drive assemblies each selectively adjusted for displacement by a preset amount in response to a driving pulse from an associated source, driven means operatively connected to all of said incremental drive assemblies for movement in a selected direction and at the same reduction ratio to displacement by only one of said incremental drive assemblies at a time, and means drivingly connecting said driven means to the control member for movement thereof in a direction and by an amount dependent upon the source from which the driving pulse is derived for digital summation of the driving pulses.

4. The combination of claim 3, wherein said drive means comprises, rack means, screw means drivingly connecting said rack means to at least one of said incremental drive assemblies for longitudinal displacement of the rack means in one direction, and slide means operatively connecting another of said incremental drive assemblies to the rack means for rotation thereof to longitudinally displace the rack means in the other direction so as to prevent simultaneous displacement of the rack means by more than one driving pulse at a time.

5. A device for totaling incremental rotation of two ratchet wheels rotated at different times by variable amounts in the same direction comprising, a frame, a pair of spindles rotatably mounted in axial alignment by the frame, one of said spindles being connected to one of the ratchet wheels and having a sliding key slot therein, the other spindle being connected to the other ratchet wheel and formed with a screw thread, a member slidably engaged with said one spindle and threadedly engaged with the screw thread on said other spindle and means axially constraining said member for axial movement relative to the key slot in said one spindle for incrementally moving a contact arm over a contact plate carried by said frame, whereby on rotation of the two spindles by the ratchet wheels the member will move along said spindles as long as one of the spindles is rotating, whereupon the contact arm will be positioned in accordance with the summation of quantities represented by the rotations of the ratchet wheels at different times.

References Cited in the file of this patent

UNITED STATES PATENTS

| | | |
|---|---|---|
| 92,678 | Weusthoff | July 13, 1869 |
| 129,339 | Hawkes | July 16, 1872 |
| 303,039 | Pearson | Aug. 5, 1884 |
| 395,862 | Winslow | Jan. 8, 1889 |
| 741,312 | Dahmke | Oct. 13, 1903 |
| 775,692 | Vogel | Nov. 22, 1904 |
| 1,044,507 | Edwards | Nov. 19, 1912 |
| 1,348,341 | Winkley | Aug. 3, 1920 |
| 2,363,132 | Lightfoot | Nov. 21, 1944 |
| 2,400,088 | Hayslett et al. | May 14, 1946 |
| 2,453,656 | Bullard | Nov. 9, 1948 |
| 2,638,789 | Binks et al. | May 19, 1953 |
| 2,684,597 | Binks | July 27, 1954 |
| 2,747,115 | Schulte | May 22, 1956 |
| 2,900,840 | Greve | Aug. 25, 1959 |
| 2,905,029 | Gustafson | Sept. 22, 1959 |
| 2,933,931 | Lisinski | Apr. 26, 1960 |
| 2,990,723 | Holpuch | July 4, 1961 |
| 2,994,227 | Lips | Aug. 1, 1961 |
| 3,036,474 | Perez | May 29, 1962 |

FOREIGN PATENTS

| | | |
|---|---|---|
| 458,953 | Great Britain | Dec. 30, 1936 |
| 542,099 | Belgium | Oct. 31, 1955 |